United States Patent
Phuyal et al.

(10) Patent No.: US 10,530,539 B2
(45) Date of Patent: Jan. 7, 2020

(54) SYSTEMS, DEVICES, AND METHODS FOR VARIABLE RTT IN HARQ OPERATIONS

(71) Applicant: INTEL IP CORPORATION, Santa Clara, CA (US)

(72) Inventors: Umesh Phuyal, Beaverton, OR (US); Richard Burbidge, Shrivenham (GB); Youn Hyoung Heo, Seoul (KR); Bharat Shrestha, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 143 days.

(21) Appl. No.: 15/619,823

(22) Filed: Jun. 12, 2017

(65) Prior Publication Data

US 2018/0159668 A1     Jun. 7, 2018

Related U.S. Application Data

(60) Provisional application No. 62/336,489, filed on May 13, 2016.

(51) Int. Cl.
    *H04L 1/18*        (2006.01)
    *H04L 5/14*        (2006.01)
    *H04L 5/00*        (2006.01)

(52) U.S. Cl.
    CPC .......... *H04L 1/1887* (2013.01); *H04L 1/1861* (2013.01); *H04L 1/1896* (2013.01);
    (Continued)

(58) Field of Classification Search
None
See application file for complete search history.

(56) References Cited

U.S. PATENT DOCUMENTS

| | | | |
|---|---|---|---|
| 2006/0062193 A1* | 3/2006 | Choi | H04B 7/2628 370/342 |
| 2007/0113138 A1* | 5/2007 | Kwon | H04L 1/0017 714/748 |

(Continued)

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 13)", V13.1.0, Mar. 2016, 85 pages.

(Continued)

*Primary Examiner* — Alex Skripnikov
*Assistant Examiner* — Sharmin Chowdhury
(74) *Attorney, Agent, or Firm* — Stoel Rives LLP

(57) ABSTRACT

Certain embodiments described herein use variable RTT for HARQ operations. Uplink HARQ may include, for example, for a first synchronous HARQ process, a UE selects first downlink resources to monitor for first HARQ feedback based on the first HARQ RTT value, and generates a first HARQ retransmission for first uplink resources in response to the first HARQ feedback. For a second synchronous HARQ process, the UE select second downlink resources to monitor for second HARQ feedback based on the second HARQ RTT value, and generates a second HARQ retransmission for second uplink resources in response to the second HARQ feedback. In certain embodiments, a RAN node signals or indicates the variable RTT values to the UE.

12 Claims, 8 Drawing Sheets

(52) U.S. Cl.
CPC .............. *H04L 5/14* (2013.01); *H04L 1/1819* (2013.01); *H04L 1/1822* (2013.01); *H04L 5/0055* (2013.01)

(56) References Cited

U.S. PATENT DOCUMENTS

| | | | | |
|---|---|---|---|---|
| 2008/0123660 | A1* | 5/2008 | Sammour | H04L 47/10 370/395.21 |
| 2009/0307554 | A1* | 12/2009 | Marinier | H04L 1/1812 714/748 |
| 2014/0362832 | A1* | 12/2014 | Rudolf | H04L 1/1822 370/336 |
| 2015/0009932 | A1* | 1/2015 | Choi | H04W 4/70 370/329 |
| 2015/0023269 | A1* | 1/2015 | Lee | H04L 1/1822 370/329 |
| 2015/0036559 | A1* | 2/2015 | Zhang | H04L 1/1854 370/280 |
| 2016/0234800 | A1* | 8/2016 | Jung | H04L 1/1812 |
| 2016/0278048 | A1* | 9/2016 | Nory | H04W 16/14 |
| 2018/0242317 | A1* | 8/2018 | Marinier | H04W 72/042 |

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 13)", V13.1.0, Mar. 2016, 349 pages.

Intel Corporation, "Discussion on HARQ operations for NR", R2-165002, 3GPP TSG-RAN2 Meeting #95, Gothenburg, Sweden, Agenda Item 9.4.2.3, Aug. 22-26, 2016, 4 pages.

NTT Docomo, "New SID Proposal: Study on New Radio Access Technology", RP-160671, 3GPP TSG RAN Meeting #71, Göteborg, Sweden, Agenda Item 9.1, Mar. 7-10, 2016, 8 pages.

* cited by examiner

SYSTEMS, DEVICES, AND METHODS FOR VARIABLE RTT IN HARQ OPERATIONS

This application claims the benefit of U.S. non-provisional patent Application No. 62/336,489, filed May 13, 2016, which is incorporated by reference herein in its entirety.

TECHNICAL FIELD

The present disclosure relates to using variable round trip time (RTT) for synchronous hybrid automatic repeat request (HARQ).

DETAILED DESCRIPTION OF PREFERRED EMBODIMENTS

Figure 1:
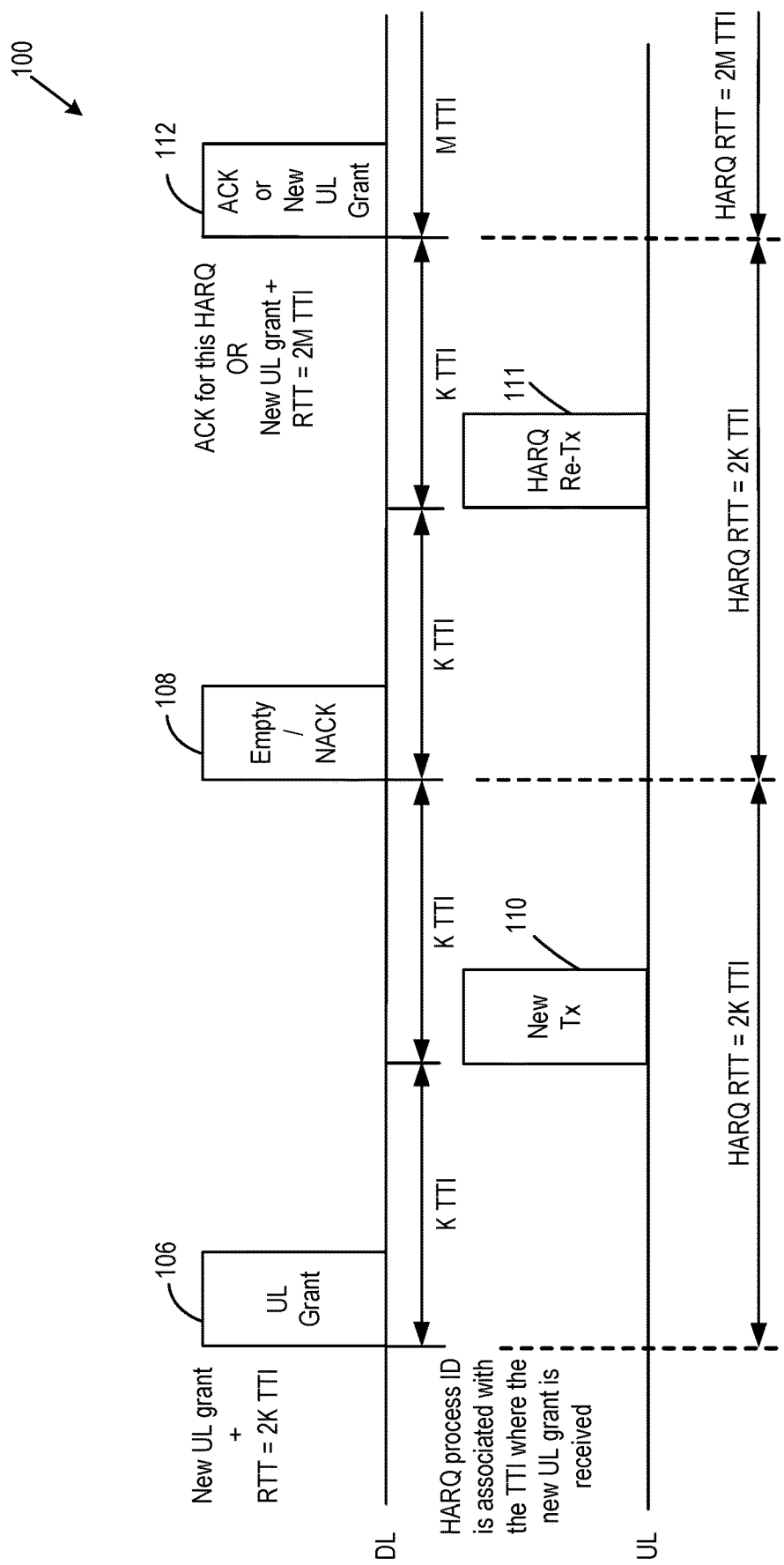
FIG. 1 is a timing diagram for synchronous uplink (UL) HARQ according to certain embodiments.

Wireless mobile communication technology uses various standards and protocols to generate and/or transmit data between a base station and a wireless communication device. Wireless communication system standards and protocols can include, for example, a 3rd Generation Partnership Project (3GPP) long term evolution (LTE); the Institute of Electrical and Electronics Engineers (IEEE) 802.16 standard, which is commonly known to industry groups as worldwide interoperability for microwave access (Wi-MAX); and the IEEE 802.11 standard, which is commonly known to industry groups as Wireless Local Area Network (WLAN) or Wi-Fi. In 3GPP radio access networks (RANs) in LTE systems, a base station may include Evolved Universal Terrestrial Radio Access Network (E-UTRAN) Node B (also commonly denoted as evolved Node B, enhanced Node B, eNodeB, or eNB) and/or Radio Network Controllers (RNCs) in the E-UTRAN, which communicate with a wireless communication device, known as user equipment (UE). In LTE networks, the E-UTRAN may include a plurality of eNodeBs and may communicate with the plurality of UEs. LTE networks include a radio access technology (RAT) and core radio network architecture that can provide high data rate, low latency, packet optimization, and improved system capacity and coverage.

A number of embodiments describe synchronous and asynchronous HARQ operations for NextGen Radio (NR) (e.g., 5G) medium access control (MAC). As used herein, a HARQ operation describes one or more HARQ processes that include transmissions and one or more retransmissions based on HARQ feedback acknowledgement (ACK)/negative acknowledgement (NACK) messages. A particular uplink (UL) HARQ process may include, for example, a transmission by a UE in an UL subframe, feedback in a corresponding HARQ feedback ACK/NACK message in a DL subframe, and a retransmission (e.g., if NACK feedback is reported or no feedback is received) in another UL subframe. As used herein, a HARQ feedback ACK/NACK message may be referred to simply as an ACK/NACK message.

In LTE, a HARQ round trip time (RTT) for downlink (DL) specifies a minimum number of subframe(s) before a DL assignment for HARQ retransmission is expected by a MAC entity. Similarly, an UL HARQ RTT specifies a minimum number of subframe(s) from an UL grant before an UL HARQ retransmission grant (or NACK) is expected by a MAC entity. Thus, in certain embodiments, the DL or UL HARQ RTT specifies a minimum number of subframe(s) between a new transmission and a corresponding HARQ retransmission. As a particular DL or UL subframe may correspond to a transmission time interval (TTI), the HARQ RTT may also be described as a time duration based on a corresponding TTI associated with a particular HARQ process. As used herein, HARQ RTT may be referred to simply as RTT.

In previous approaches, the HARQ RTT is fixed for synchronous HARQ processes. That is, the HARQ RTT for synchronous HARQ is static or predefined and does not change from one HARQ process to the next HARQ process. In a number of example embodiments disclosed herein, however, synchronous HARQ operations are configured to function with variable HARQ RTT. The example embodiments are not limiting, but representative of the implementation of variable HARQ RTT for synchronous HARQ processes. In one example embodiment, the variable HARQ RTT may not be dynamically changed between a first transmission and its subsequent retransmission (i.e., the RTT is deterministic once a new transmission is started). However, the HARQ RTT may be different for different new transmissions. In another example embodiment, the HARQ RTT may be changed dynamically for each new transmission and its subsequent retransmissions. In yet another example embodiment, for multiple TTI coexistence, the HARQ operation depends on the periodicity by which the scheduler determines the transport block (TB) size, and a method is provided to determine a minimum scheduling interval based on the multiple TTI. In another example embodiment, prioritization is provided for transmission instants, if the retransmission instants coincide with each other (e.g., to prioritize new transmissions over retransmissions or to prioritize retransmissions of one type of traffic over another type).

In an example method according to one embodiment, the network signals or indicates a selected HARQ RTT to the UE. The signal or indication may be included, for example, in an UL grant for new transmission, in dedicated signaling from the network such as radio resource control (RRC) signaling, or in system information broadcast (SIB) signaling.

In an example method according to another embodiment, a UE applies the variable HARQ RTT for performing synchronous HARQ retransmission in the UL. The variable HARQ RTT may be predefined in the standard based on, for example, a type of traffic being communicated, a type or class of UE, or a duration of TTI being used for communication of the data traffic. In other embodiments, the variable HARQ RTT is decided by the network dynamically and communicated to the UE (e.g., using one or more of the methods discussed in the example method above).

In an example method according to another embodiment, the network is configured to change the HARQ RTT of an ongoing synchronous UL HARQ process. An UL example of making the change includes providing an UL grant for retransmission indicating a new HARQ RTT value (e.g., as described in the above examples).

An example method according to another embodiment includes determining a minimum scheduling interval of TB size for a UE in case of multiple TTI coexistence. The minimum scheduling interval may be determined to be, for example, the shorter TTI duration, the longer TTI duration, a multiple of shorter TTI duration (i.e., X times shorter TTI), or a multiple of larger TTI duration (i.e., X times larger TTI). In certain such embodiments, a single assignment or grant for a TTI applies for X TTIs equivalently forming a multi-TTI assignment or grant.

An example method according to another embodiment includes prioritizing between the HARQ retransmissions and new transmissions, if the transmission instant collides. In certain embodiments, for example, the new transmissions of higher priority class are prioritized over the retransmissions of lower priority class. In addition, or in other embodiments, retransmissions are prioritized within the same class. In other embodiments, the retransmissions are prioritized over the new transmissions regardless of priority class. Alternatively, the new transmissions may be prioritized over the retransmissions following certain criteria described herein in various embodiments.

Although in certain embodiments herein the explanations and examples may be provided using LTE terminology (e.g., channel names among other LTE terms) for better understanding, the LTE terminology should not be constructed as a limiting factor for the examples described. The embodiments described may be applicable to other technologies such as LTE, LTE-advanced, LTE-advanced Pro, NR (e.g., 5G), and/or other evolutions.

Reference is now made to the figures, in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIGS. 1-5 illustrate timing diagrams 100, 200, 300, 400, 500 for various HARQ procedures according to certain embodiments. The timing diagrams include timelines for a UE to receive and process control and feedback data from a RAN node through one or more DL channels, and for the UE to generate and transmit data to the RAN node through one or more UL channels. Although not shown in FIGS. 1-5, the UE and the RAN node referred to may include, for example, any of the UEs 601, 602 or the RAN nodes 611, 612 shown in FIG. 6. By way of example, a physical uplink shared channel (PUSCH) may be used to communicate new UL transmissions (Tx), and a physical downlink control channel (PDCCH) may be used in the DL to communicate the illustrated UL grants. In certain embodiments, the PDCCH may also be used to communicate at least one of the illustrated ACK message and NACK message. In other embodiments, a physical HARQ indicator channel (PHICH) may be used to communicate at least one of the illustrated ACK message and NACK message. In one embodiment, for example, the PHICH is used to communicate a NACK message and the PDCCH is used to communicate an ACK message for a particular HARQ process. Other signals or DL/UL channels may also be used.

FIG. 1 is a timing diagram 100 for synchronous UL HARQ according to certain embodiments. The illustrated example synchronous HARQ procedure includes receiving and processing an UL grant 106 (e.g., in the PDCCH). A HARQ process identifier (ID) is associated with the TTI where the new UL grant 106 is received. The example synchronous HARQ procedure further includes, after a time duration of K*TTI (or simply K TTI), generating a new transmission (Tx) 110 (e.g., in the PUSCH). K may be an integer multiplier (i.e., K=1, 2, 3, ... ) selected to define a minimum time duration between receiving the UL grant 106 and transmitting UL data in the new transmission 110. The HARQ RTT is a time duration between receiving the UL grant and receiving a corresponding feedback message 108 (e.g., in the PHICH or PDCCH).

In certain LTE systems, K may be predefined as K=4. Thus, for example, for TTI=1 millisecond (ms), the time duration between receiving the downlink grant 106 and generating the new transmission 110 is 4 ms. In certain such LTE systems, the HARQ RTT=2K TTI=8 ms, where K is predefined and not explicitly signaled between the RAN node and the UE. In certain embodiments disclosed herein, however, the value of K TTI may be different than 4 TTI (i.e., it may be greater than or less than 4 TTI), and may be signaled from the RAN node to the UE via, for example, PDCCH, RRC signal, or broadcast message.

In the illustrated example of FIG. 1, the feedback message 108 is empty or indicates NACK, which causes the synchronous HARQ procedure to generate a HARQ retransmission (Re-Tx) 111, at time K TTI after receiving the feedback message 108. After another time duration of K TTI, the example synchronous HARQ procedure includes receiving (e.g., in the PDCCH) either an ACK for the current HARQ process ID or a new UL grant 112.

In a first embodiment using variable HARQ RTT, the RTT is not dynamically changed (i.e., the RTT remains static) between a first transmission and its subsequent retransmission(s). In other words, the RTT is deterministic once a new transmission is started. However, the RTT may be variable for different new transmissions corresponding to subsequent HARQ processes. To support synchronous UL HARQ according to certain such embodiments, a new RTT value is selected or associated with a new transmission of a particular HARQ process, if the RTT is dynamically changed across different new transmissions.

A first RTT value can be associated with a first HARQ process and a second RTT value can be associated with a second HARQ process, the first RTT value being different than the second RTT value. Also, the first RTT value can be the same as a second RTT value given that the first RTT value may be assigned to the first HARQ process independently from the assignment of the second RTT value to the second HARQ process. Independently assigning the first RTT value to the first HARQ process and the second RTT value to the second HARQ process can include identifying characteristics of at least one of a new transmission, the UE transmitting the new transmission, and/or an application associated with the new transmission (e.g., application requesting the new transmission), and selecting RTT values based on the identified characteristics.

In a first example of the first embodiment, the UL grant for a new transmission includes an indication of the HARQ RTT value to be used for synchronous HARQ in UL. As shown in FIG. 1, for example, the UL grant 106 includes an indication of the RTT=2K TTI and the new UL grant 112 includes a new value for RTT=2M TTI, where M is an integer multiplier that may be different than K. The time duration between the new UL grant 112 and a subsequent new transmission (not shown) may also change from K TTI to M TTI, as shown in FIG. 1. In other embodiments, however, the time duration between a particular UL grant and the subsequent corresponding transmission may continue to be K TTI, even as the value of RTT changes.

Figure 2:
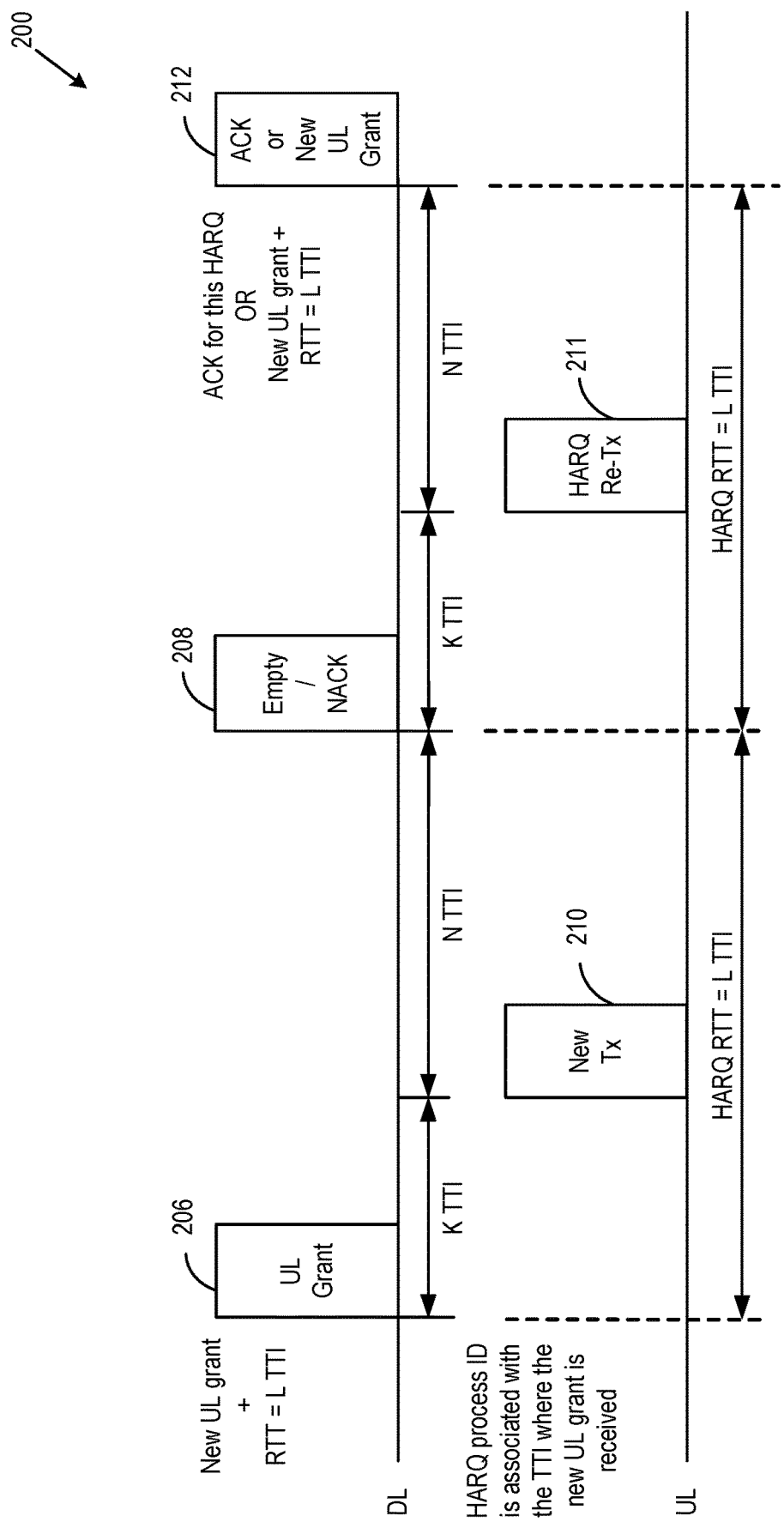
FIG. 2 is a timing diagram for synchronous UL HARQ according to certain embodiments.

For example, FIG. 2 is a timing diagram 200 for synchronous UL HARQ according to certain embodiments where a new UL grant 206 includes an indication that RTT=L TTI. In this example, L>2K such that the illustrated time duration N TTI is greater than K TTI. At a time K TTI after receiving the UL grant 206, the UE generates a new transmission (Tx) 210, for which a feedback message 208 is received L TTI after the UL grant 206. In this example, the feedback message 208 is empty or indicates NACK, which causes the synchronous HARQ procedure to generate a HARQ retransmission (Re-Tx) 211, at time K TTI after receiving the feedback message 208. At time L TTI after receiving the feedback message 208, the UE receives either an ACK for the current HARQ process ID or a new UL grant 212 (including a new HARQ RTT value).

In some embodiments, the HARQ RTT can be generated by a RAN node and/or a component of the RAN node or a core network. The UE uses the provided HARQ RTT value to perform the synchronous retransmission. In an embodiment, a number of different possible RTT values are associated with corresponding indexes. Thus, each UL grant for a new HARQ process can indicate an index associated with a HARQ RTT value to use with the new HARQ process. The index can be provided to the UE, which can utilize the associated HARQ RTT value (e.g., stored in a memory device) for transmissions and retransmissions associated with the HARQ RTT process.

In a second example of the first embodiment, rather than indicating the HARQ RTT value in the UL grant, the HARQ RTT is predefined for different types of applications executed by the UE. For example, low latency applications may be associated with a first RTT value whereas high data rate application may be associated with a second RTT value. The UE determines the RTT to be used based on the type of application for which the UL grant is provided.

In a third example of the first embodiment, rather than indicating the HARQ RTT value in the UL grant, the HARQ RTT is predefined for TTI values. In an NR embodiment, for example, multiple values of TTI may coexist with each other. For example, low latency applications may have smaller TTI values, whereas high data rate applications may have different (e.g., higher) TTI values than those selected for low latency applications. The UE determines the RTT to be applied based on the TTI value for which the UL grant is provided. In some examples, the UE and/or the RAN node can select and/or measure a TTI value.

In a fourth example of the first embodiment, the HARQ RTT values for UL synchronous HARQ can be predefined for the UE based on the type and/or class of UE. For example, low latency UEs may be associated with smaller HARQ RTT values as compared to higher HARQ RTT values that may be associated with high data rate UEs. The UE can use the predefined HARQ RTT values for synchronous UL HARQ operation based on the class and/or type of UE. As used herein, the class and/or type of UE can define any classification and/or distinction between different UEs, such as machine type communication UEs, among others. The UE selects a predefined HARQ RTT value based on the type and/or class of the UE.

In a fifth example of the first embodiment, the HARQ RTT for UL synchronous HARQ can be signaled to the UE based on the type and/or class of the UE. For example, a low latency UE can receive (e.g., may be signaled) a smaller RTT value as compared to a higher RTT value received by a high data rate UE. The UE uses the signaled HARQ RTT value in association with the synchronous UL HARQ process. The signaling can be provided, for example, using a dedicated RRC signal or using a broadcast signal such as a system information broadcast (SIB). If the RTT value is provided using an RRC signal, the RTT can be configured on a per UE basis based on, for example, a subscription class and/or a quality of service (QoS) class associated with a plurality of UEs, among others. If the RTT value is provided using SIB signaling, the UEs belonging to the specific types/classes apply the RTT value signaled in the SIB. In any type of network signal options, the RTT can be dynamically updated by the network based on various criteria such as network load, among others.

In a second embodiment, the HARQ RTT may be changed dynamically for each new transmission and its subsequent retransmissions. In a first example of the second embodiment, adaptive HARQ retransmissions can be used whenever the RTT values need to be changed. That is, an UL grant for adaptive HARQ retransmission can be sent to the UE to indicate the use of a new HARQ RTT value. As such, a first RTT value can be associated with a new transmission of a HARQ process and a second RTT value can be associated with a subsequent HARQ retransmission of the HARQ process, the first RTT value being different than the second RTT value.

Figure 3:
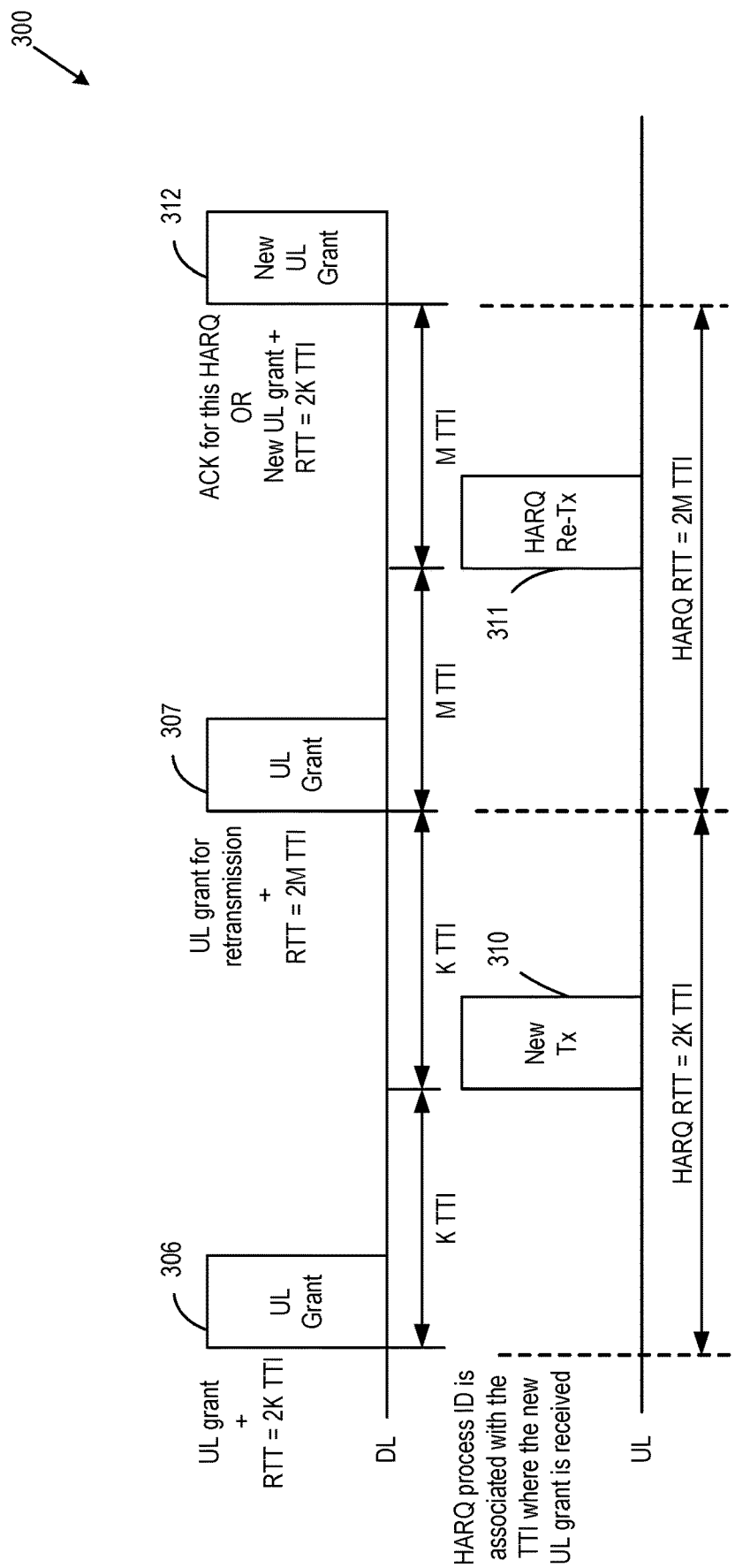
FIG. 3 is a timing diagram for synchronous UL HARQ according to certain embodiments.

For example, FIG. 3 is a timing diagram 300 for synchronous UL HARQ according to certain embodiments for dynamically changing RTT. The illustrated example synchronous HARQ procedure includes receiving and processing a first UL grant 306 (e.g., in the PDCCH) that includes an indication of RTT=2K TTI. A HARQ process ID is associated with the TTI where the first UL grant 306 is received. The example synchronous HARQ procedure further includes, after a time duration of K TTI, generating a new transmission (Tx) 310 (e.g., in the PUSCH). If the new transmission 310 fails to be delivered, at time 2K TTI after the first UL grant 306, the example synchronous HARQ procedure includes receiving and processing a second UL grant (307) (e.g., in the PDCCH) for HARQ retransmission, including a new indication for RTT=2M TTI. In this example, K and M are different than one another and K, M=1, 2, 3, . . . . In response to the second UL grant 307 for HARQ retransmission, the synchronous HARQ procedure generates a HARQ retransmission (Re-Tx) 311 (e.g., in the PUSCH), at time M TTI after receiving the second UL grant 307. At time 2M TTI after the second UL grant 307, the example synchronous HARQ procedure includes receiving (e.g., in the PDCCH) either an ACK for the current HARQ process ID or a new UL grant 312. By way of example only, the new UL grant 312 includes an indication to change the RTT back to 2K TTI.

In a second example of the second embodiment, asynchronous HARQ processes can be used where each retransmission is explicitly allocated using an UL grant. As such, in certain embodiments, there may be no need to indicate the HARQ RTT given that each retransmission is explicitly allocated. The HARQ RTTs can be used by a UE and/or an RAN node to determine when to generate new transmissions and/or HARQ retransmissions.

Figure 4:
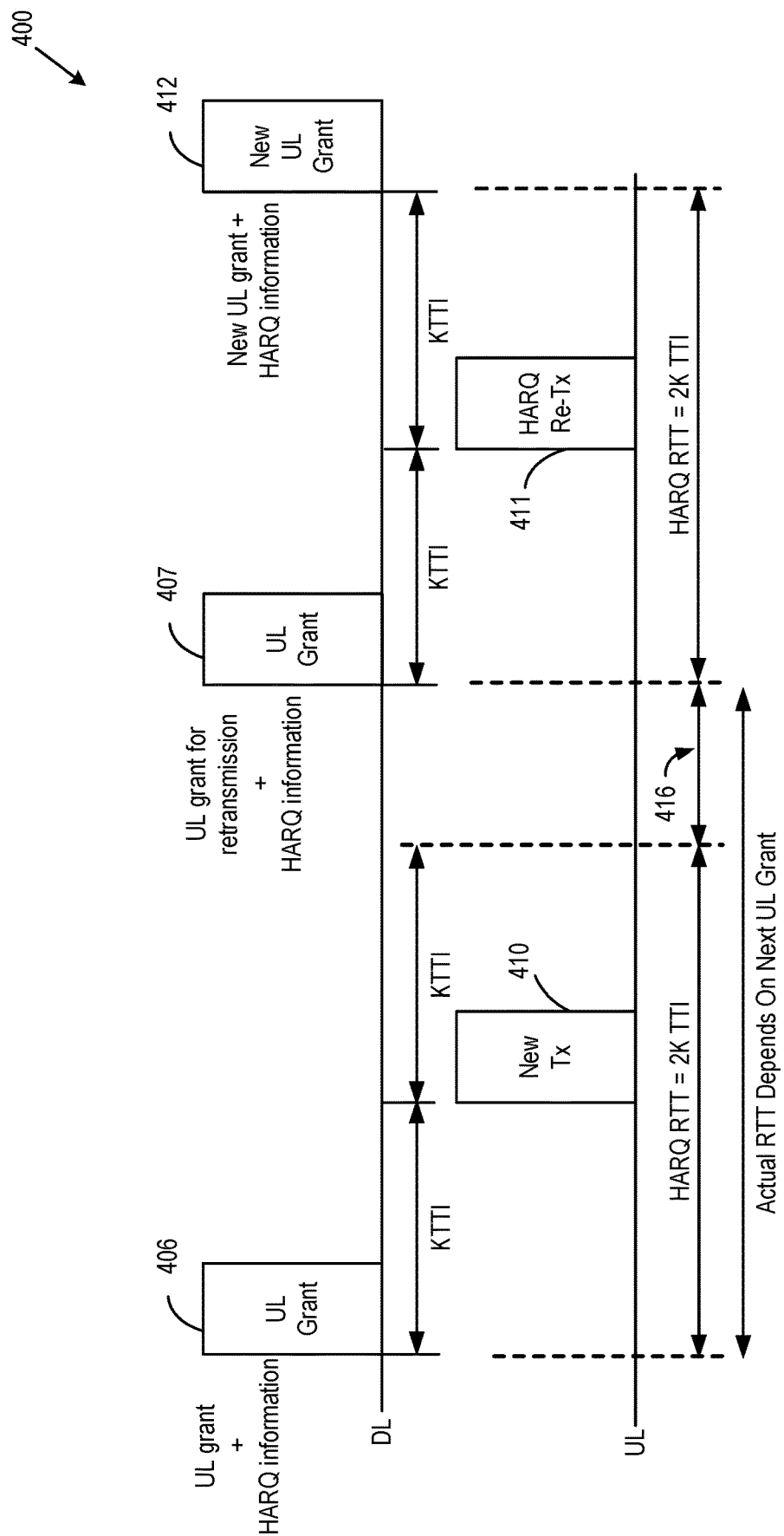
FIG. 4 is a timing diagram for asynchronous UL HARQ according to certain embodiments.

For example, FIG. 4 is a timing diagram 400 for asynchronous UL HARQ according to one embodiment for dynamically changing RTT. The illustrated example asynchronous HARQ procedure includes receiving and processing a first UL grant 406 (e.g., in the PDCCH) that includes HARQ information, such as a HARQ ID. The example asynchronous HARQ procedure further includes, after a time duration of K TTI, generating a new transmission (Tx) 410 (e.g., in the PUSCH). For asynchronous HARQ, the HARQ feedback may arrive at an unknown time after the new transmission 410. Thus, during a time duration 416 after the HARQ RTT (e.g., 2K TTI in this example), the UE continues to monitor for an expected feedback (in this example, a second UL grant 407 for HARQ retransmission). In other words, as HARQ RTT defines a minimum time duration between the UL grant 406 and receiving the HARQ feedback, the actual RTT depends on the timing of receiving the second (next) UL grant 407.

If the new transmission 410 fails to be delivered, the example asynchronous HARQ procedure includes receiving and processing the second UL grant (407) (e.g., in the PDCCH) for HARQ retransmission. In response, the asynchronous HARQ procedure generates a HARQ retransmission (Re-Tx) 411 (e.g., in the PUSCH), at time K TTI after receiving the second UL grant 407. At time 2K TTI after the second UL grant 407 (or at an unknown time thereafter), the example asynchronous HARQ procedure includes receiving (e.g., in the PDCCH) new UL grant 412 with HARQ information, such as a new HARQ ID.

In a third embodiment, different frame structures, such as self-contained frames capable of allowing short HARQ RTT, can be used. A TTI can be selected and/or calculated based on subcarrier spacing. A UE can be configured to receive and/or calculate the different TTI values. Where multiple TTI values coexist, a HARQ operation depends on the periodicity by which the scheduler determines a transport block size (TBS), as the TBS can affect scheduling operations. The scheduler is a component of the RAN such as a RAN node, among other examples. As used herein, the periodicity by which the scheduler determines a TBS describes a scheduling interval.

In a first example of the third embodiment, the minimum scheduling interval can be based on a shorter TTI, e.g., a predetermined TTI such as a minimum TTI. In a second example of the third embodiment, the minimum scheduling interval can be based on a larger TTI, e.g., a predetermined TTI such as a maximum TTI. In a third example of the third embodiment, the minimum scheduling interval can be based on one or more predetermined values other than the minimum TTI and the maximum TTI. For example, the minimum scheduling interval can be based on a minimum TTI and a next to minimum TTI. That is, a single TBS can be decided jointly for a plurality of TTIs (e.g., a plurality of X shortest TTIs including a minimum TTI). Selecting a single TBS to correspond to a plurality of TTIs is referred to as a multi-TTI assignment and/or a multi-TTI grant where a single assignment/grant applies for a plurality of TTIs.

In a fourth example of the third embodiment, the minimum scheduling interval can be based on one or more values such as a plurality of largest TTIs. A single TBS can be selected and/or calculated for the Y largest TTIs including the maximum TTI. This can be seen as a multi-TTI assignment and/or a multi-TTI grant where a single assignment/grant applies for a plurality of TTIs. The above examples also depend on how the TTI is defined, how the boundaries are aligned, and how UL grants are provided/differentiated for separate TTI sizes.

In a fourth embodiment, when the HARQ RTT is not fixed, such as when handling multiplexing of traffic with different HARQ RTT values, further procedures may be defined for prioritizing transmissions if the retransmission instants coincide with each other. HARQ RTT is not fixed, for example, when multiplexing bearers with different HARQ RTT values (e.g., for enhanced mobile broadband (eMBB) traffic, ultra-reliable and low-latency communications (URLLC), among other types of traffic).

Figure 5:
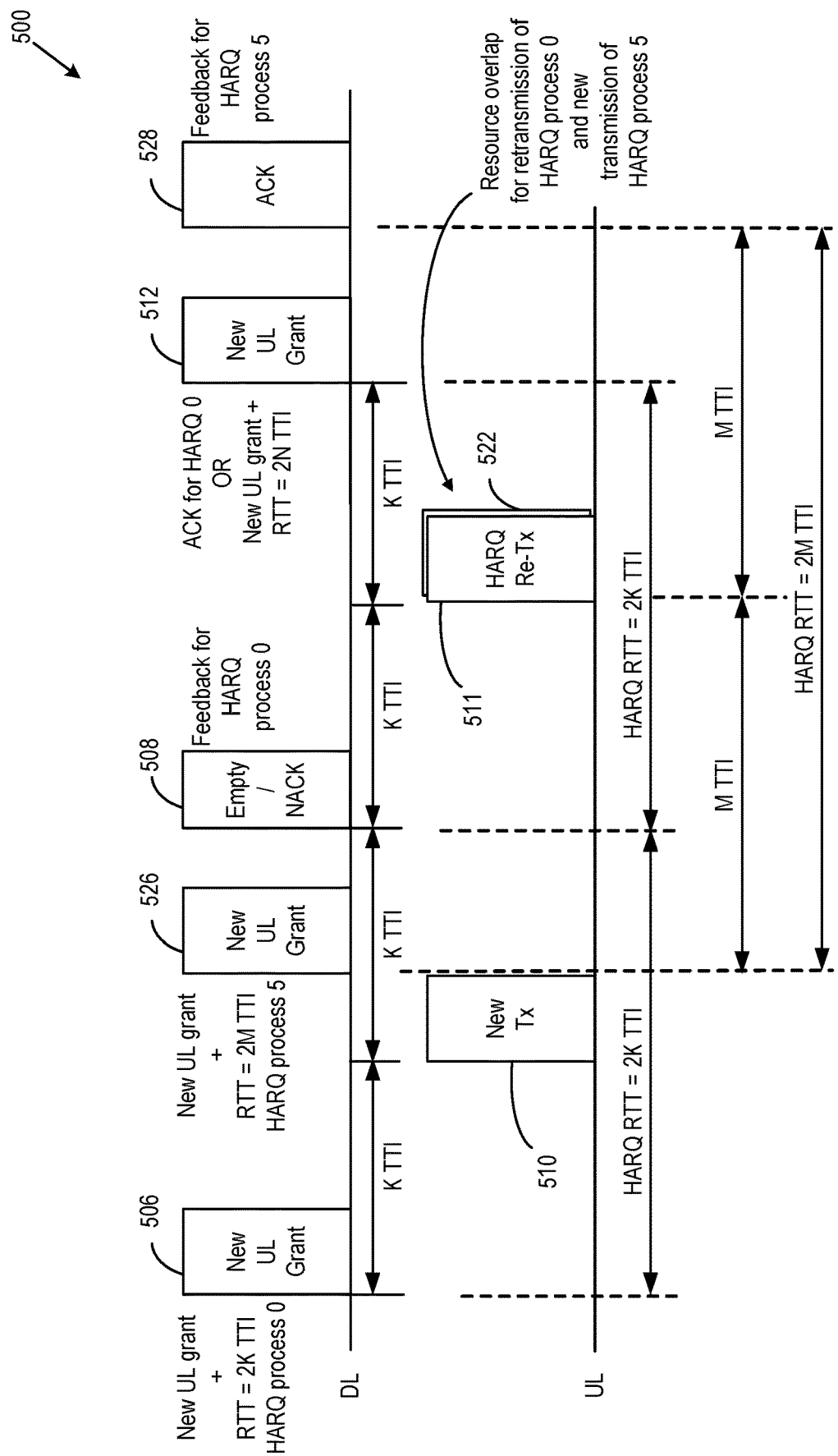
FIG. 5 is a timing diagram for synchronous UL HARQ according to certain embodiments.

An example of coincident transmission and retransmission is shown in FIG. 5, which is a timing diagram 500 for synchronous UL HARQ according to certain embodiments. The illustrated example synchronous UL HARQ procedure shows a retransmission of HARQ process 0 colliding with a new transmission of HARQ process 5 for K, M, N=1, 2, 3, . . . . For HARQ process 0, the HARQ procedure includes receiving and processing an UL grant 506 (e.g., in the PDCCH) that includes an indication of RTT=2K TTI, after a time duration of K TTI generating a new transmission (Tx) 510 (e.g., in the PUSCH), receiving and processing an empty or NACK feedback message 508 at a time corresponding to RTT=2K TTI, generating a HARQ retransmission (Re-Tx) 511 at time K TTI after receiving the feedback message 508, and after another time duration of K TTI receiving (e.g., in the PDCCH) either an ACK for the HARQ process 0 or a new UL grant 512. In this example, the new UL grant 512 includes an indication for RTT=2N TTI, which may be different than (or the same as) 2K TTI or 2M TTI.

Similarly, for HARQ process 5, the HARQ procedure includes receiving and processing an UL grant 526 (e.g., in the PDCCH) that includes an indication of RTT=2M TTI, after a time duration of M TTI generating a new transmission (Tx) 522 (e.g., in the PUSCH), and after another time duration of M TTI receiving (e.g., in the PDCCH) a feedback message 528 for HARQ process 5 (e.g., ACK in this example). As shown, the allocated UL resources overlap for the HARQ retransmission 511 of HARQ process 0 and the new transmission 522 of HARQ process 5. Thus, according to certain embodiments, the UE uses prioritization rules to decide whether to transmit the HARQ retransmission 511 or the new transmission 522 in the allocated UL resources. Prioritizing transmissions includes giving priority to one transmission over a different transmission(s) (e.g., new transmission or retransmission of one type of traffic over another).

In a first example of the fourth embodiment, a HARQ retransmission is prioritized over new transmissions. In a second example of the fourth embodiment, priority may be based on the type of traffic. For example, new transmissions of higher priority traffic may be prioritized over HARQ retransmissions of lower priority traffic. Within the same priority, HARQ retransmissions may be prioritized over new transmissions. For example, a new transmission of low latency and/or URLLC traffic may be prioritized over an eMBB HARQ retransmission. In a third example of the fourth embodiment, priority of new transmissions and HARQ retransmissions is based on the smallest or largest HARQ process ID.

The above examples apply to both downlink and uplink operations. The above examples are pertinent to UL operations due to a dependency on the design of the UL grants.

Figure 6:
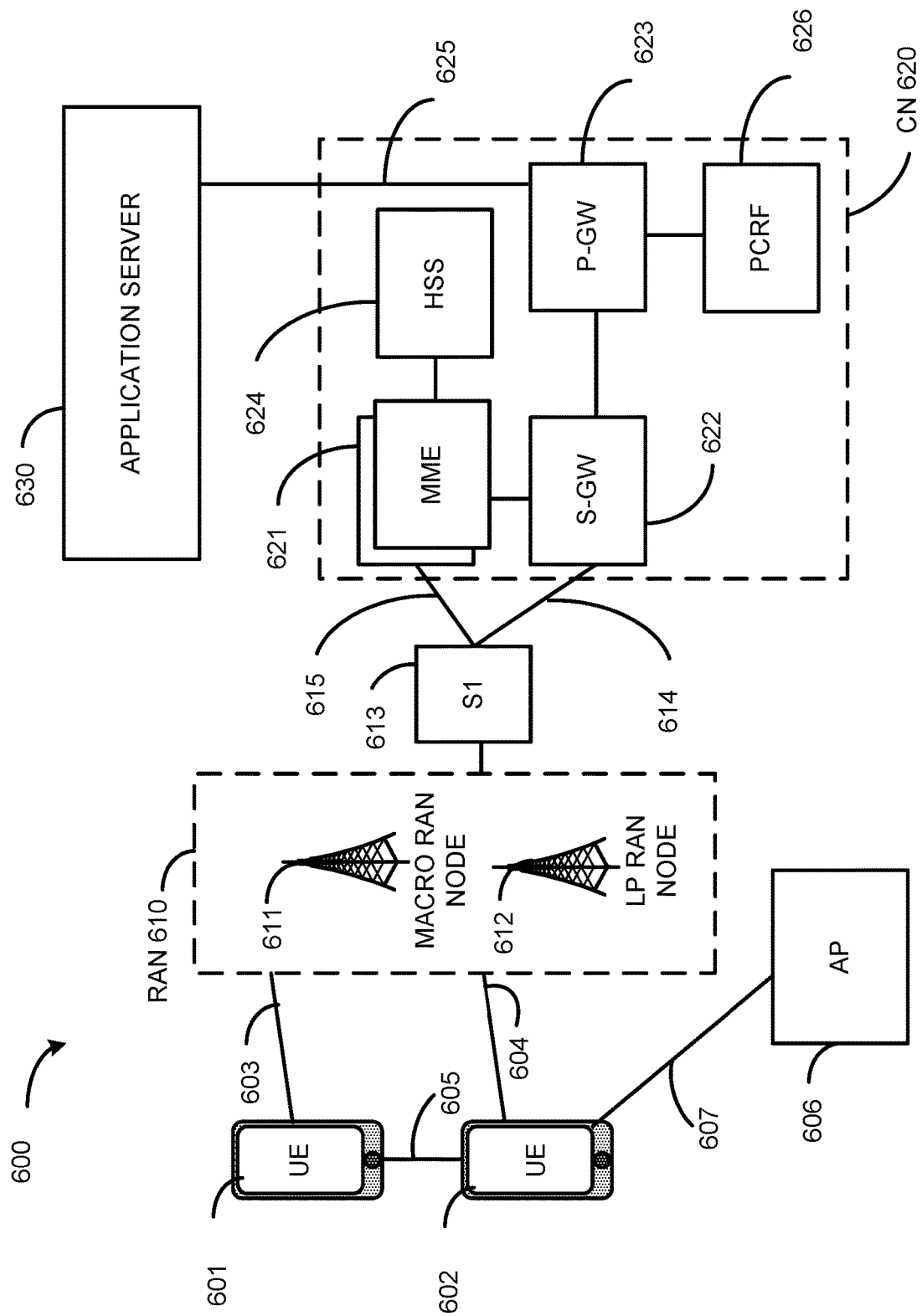
FIG. 6 illustrates an architecture of a system of a network according to certain embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610. The RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The PDCCH may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and a serving gateway (S-GW) 622, and an S1-mobility management entity (MME) interface 615, which is a signaling interface between the RAN nodes 611 and 612 and MMEs 621.

In this embodiment, the CN 620 comprises the MMEs 621, the S-GW 622, a Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the CN 620 (e.g., EPC network) and external networks such as a network including the application server 630 (alternatively referred to as application function (AF)) via an Internet Protocol (IP) interface 625. Generally, an application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. A Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
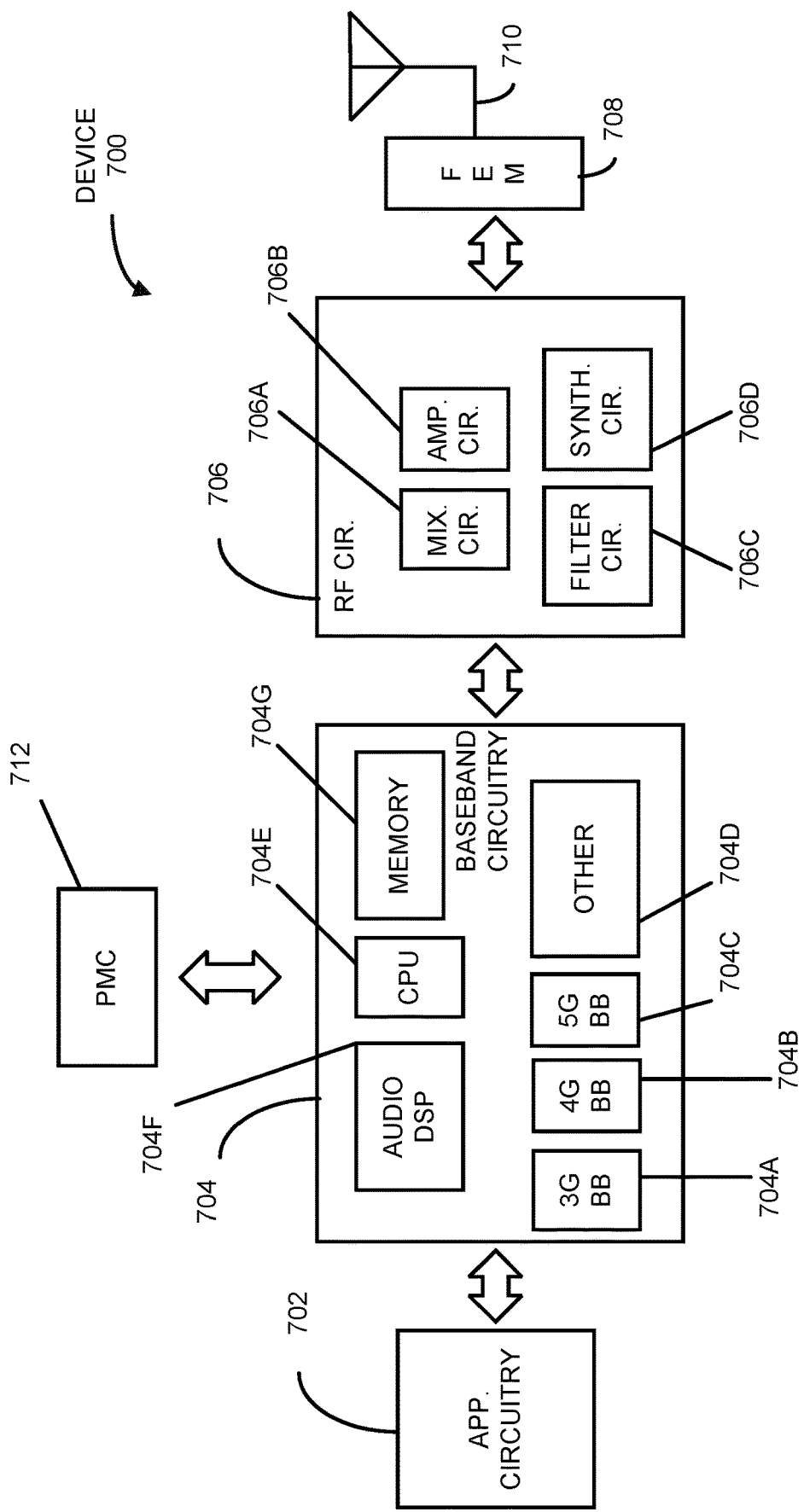
FIG. 7 illustrates example components of a device according to certain embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or an RAN node. In some embodiments, the device 700 may include fewer elements (e.g., an RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. The RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706A, amplifier circuitry 706B and filter circuitry 706C. In some embodiments, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by the filter circuitry 706C.

In some embodiments, the mixer circuitry 706A of the receive signal path and the mixer circuitry 706A of the transmit signal path may include two or more mixers and may be arranged for quadrature downconversion and upconversion, respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. The FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by the RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device 700 is included in a UE. The PMC 712 may increase the power conversion efficiency while providing desirable implementation size and heat dissipation characteristics.

FIG. 7 shows the PMC 712 coupled only with the baseband circuitry 704. However, in other embodiments, the PMC 712 may be additionally or alternatively coupled with, and perform similar power management operations for, other components such as, but not limited to, the application circuitry 702, the RF circuitry 706, or the FEM circuitry 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
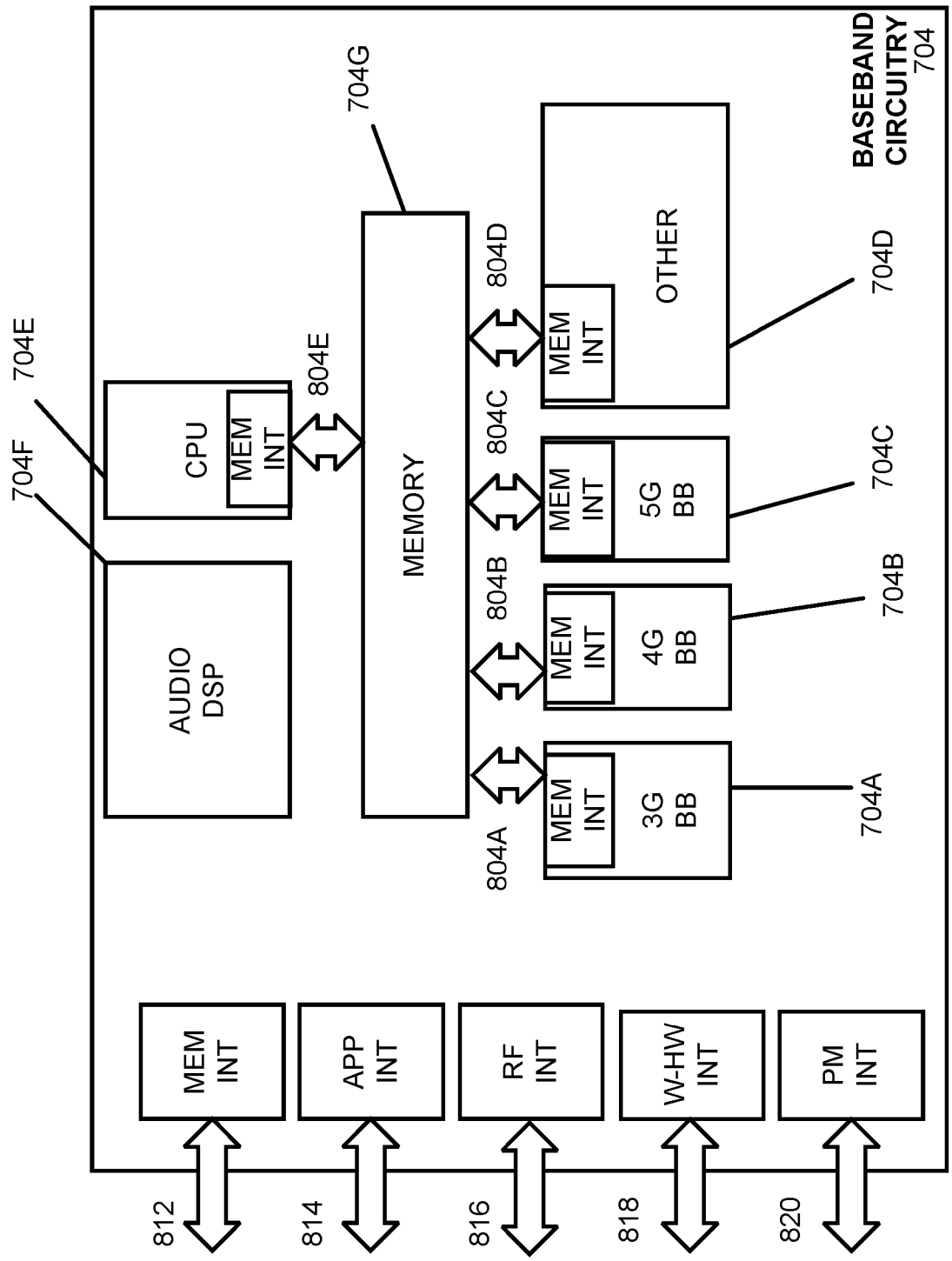
FIG. 8 illustrates example interfaces of baseband circuitry according to certain embodiments.

FIG. 8 illustrates example interfaces of baseband circuitry in accordance with some embodiments. As discussed above, the baseband circuitry 704 of FIG. 7 may comprise processors 704A-704F and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

The following are example embodiments.

Example 1 is an apparatus for a user equipment (UE). The apparatus includes a memory interface to store or access, to or from a memory device, a first hybrid automatic repeat request (HARQ) round trip time (RTT) value and a second HARQ RTT value. The first HARQ RTT value is not equal to the second HARQ RTT value. The apparatus also includes one or more baseband processors to, for a first synchronous HARQ process, select first downlink (DL) resources to monitor for first HARQ feedback based on the first HARQ RTT value, and generate a first HARQ retransmission for first uplink (UL) resources in response to the first HARQ feedback. The one or more baseband processors are also to, for a second synchronous HARQ process, select second DL resources to monitor for second HARQ feedback based on the second HARQ RTT value, and generate a second HARQ retransmission for second UL resources in response to the second HARQ feedback.

Example 2 includes the apparatus of Example 1, wherein the one or more baseband processors are further configured to select the first UL resources for the first HARQ retransmission based on the first HARQ RTT value.

Example 3 includes the apparatus of Example 1, wherein the memory interface is further configured to access or store a third HARQ RTT value, wherein the third HARQ RTT value is not equal to the first HARQ value, and wherein the one or more baseband processors are further configured to select the first UL resources for the first HARQ retransmission based on the third HARQ RTT value.

Example 4 includes the apparatus of Example 3, wherein the one or more baseband processors are further configured to, for the first synchronous HARQ process, decode a UL grant for retransmission, the UL grant for retransmission including the third HARQ RTT value.

Example 5 includes the apparatus of any of Examples 1-3, wherein the one or more baseband processors are further configured to determine the first HARQ RTT value from a first UL grant for a first new transmission corresponding to the first synchronous HARQ process, and determine the second HARQ RTT value from a second UL grant for a second new transmission corresponding to the second synchronous HARQ process.

Example 6 includes the apparatus of Example 5, wherein the one or more baseband processors are further configured to decode a physical downlink control channel (PDCCH) to extract at least one of the first UL grant and the second UL grant.

Example 7 includes the apparatus of Example 5, wherein the one or more baseband processors are further configured to encode at least one of the first new transmission, the first HARQ retransmission, the second new transmission, and the second HARQ retransmission for a physical uplink shared channel (PUSCH).

Example 8 includes the apparatus of any of Examples 1-3, wherein the one or more processors are further configured to decode a first dedicated radio resource control (RRC) signal, received from a radio access network (RAN) node, corresponding to the first synchronous HARQ process, extract the first HARQ RTT value from the first dedicated RRC signal, store the first HARQ RTT value utilizing the memory interface, decode a second dedicated RRC signal, received from the RAN node, corresponding to the second synchronous HARQ process, extract the second HARQ RTT value from the second dedicated RRC signal, and store the second HARQ RTT value utilizing the memory interface.

Example 9 includes the apparatus of any of Examples 1-3, wherein the one or more processors are further configured to decode a first system information broadcast (SIB) signal, received from a radio access network (RAN) node, corresponding to the first synchronous HARQ process, extract the first HARQ RTT value from the first SIB signal, store the first HARQ RTT value utilizing the memory interface, decode a second SIB signal, received from the RAN node, corresponding to the second synchronous HARQ process, extract the second HARQ RTT value from the second SIB signal, and store the second HARQ RTT value utilizing the memory interface.

Example 10 includes the apparatus of any of Examples 1-3, wherein the one or more baseband processors are further configured to select the first HARQ RTT value based on a first type of application associated with the first HARQ synchronous process, and select the second HARQ RTT value based on a second type of application associated with the second synchronous HARQ process.

Example 11 includes the apparatus of any of Examples 1-3, wherein the one or more baseband processors are further configured to select the first HARQ RTT value and the second HARQ RTT value based on a UE type or class.

Example 12 includes the apparatus of any of Examples 1-3, wherein the one or more baseband processors are further configured to select the first HARQ RTT value and the second HARQ RTT value based on a transmission time interval (TTI) used for communication of data traffic.

Example 13 includes the apparatus of any of Examples 1-3, wherein a new transmission corresponding to the second synchronous HARQ process is allocated at least a portion of the first uplink resources so as to collide with the first HARQ retransmission of the first synchronous HARQ process, and wherein the one or more baseband processors are further configured to use one or more prioritization rules to determine whether to transmit the new transmission or the first HARQ retransmission using the first uplink resources.

Example 14 includes the apparatus of Example 13, wherein the one or more prioritization rules prioritize new transmissions of higher priority class over HARQ retransmissions of lower priority class, and wherein the one or more prioritization rules prioritize retransmissions within the same class.

Example 15 includes the apparatus of Example 13, wherein the one or more prioritization rules prioritize HARQ retransmissions over the new transmissions regardless of priority class.

Example 16 includes the apparatus of Example 13, wherein the one or more prioritization rules prioritize new transmissions and HARQ retransmissions based on corresponding HARQ process identifier (ID) numbers.

Example 17 is a computer-readable storage medium having stored thereon instructions that, when implemented by one or more processors of a radio access network (RAN) node, cause the one or more processors to select a value for a variable round trip time (RTT) to use for a particular hybrid automatic repeat request (HARQ) process, generate an indication to communicate, to a user equipment (UE), the selected value for the variable RTT, and perform (in either uplink (UL) or downlink (DL) communication with the UE) the particular HARQ process using the selected value for the variable RTT.

Example 18 includes the computer-readable storage medium of Example 17, wherein to generate the indication, the instructions are further to encode the selected value for the variable RTT in an UL grant for a new transmission.

Example 19 includes the computer-readable storage medium of Example 17, wherein to generate the indication, the instructions are further to encode the selected value for the variable RTT in a dedicated radio resource control (RRC) signal.

Example 20 includes the computer-readable storage medium of Example 17, wherein to generate the indication, the instructions are further to include the selected value for the variable RTT in system information broadcast (SIB) signaling.

Example 21 includes the computer-readable storage medium of any of Examples 17-20, wherein the instructions are further to select the value for the variable RTT based on a transmission time interval (TTI) used during the particular HARQ process.

Example 22 includes the computer-readable storage medium of any of Examples 17-20, wherein the instructions are further to select the value for the variable RTT based on at least one of a type of application executed by the UE, and a type or class of the UE.

Example 23 includes the computer-readable storage medium of Example 17, wherein the instructions are further to, for multiple transmission time interval (TTI) coexistence, determine a minimum scheduling interval of transport block size (TBS) for the UE.

Example 24 includes the computer-readable storage medium of Example 23, wherein the minimum scheduling interval is a shortest of a plurality of TTI durations.

Example 25 includes the computer-readable storage medium of Example 23, wherein the minimum scheduling interval is a longest of a plurality of TTI durations.

Example 26 includes the computer-readable storage medium of Example 23, wherein the minimum scheduling interval comprises a shortest of a plurality of TTI durations multiplied by a constant X.

Example 27 includes the computer-readable storage medium of Example 23, wherein the minimum scheduling interval comprises a longest of a plurality of TTI durations multiplied by a constant X.

Example 28 includes the computer-readable storage medium of any of Examples 26-27, wherein a single assignment or grant for a particular TTI applies for X TTIs equivalently forming a multi-TTI assignment or grant.

Example 29 is a computer-readable storage medium having stored thereon instructions that, when implemented by one or more processors of a user equipment (UE), cause the one or more processors to decode a physical downlink control channel (PDCCH) to extract an uplink (UL) grant and a value of a variable round trip time (RTT), and use the value of the variable RTT for a synchronous UL hybrid automatic repeat request (HARQ) process associated with a transmission time interval (TTI) corresponding to the UL grant.

Example 30 includes the computer-readable storage medium of Example 29, wherein the instructions further cause the one or more processors to encode a physical uplink shared channel (PUSCH) using first resources indicated by the UL grant for a new transmission, decode second resources, selected based on the value of the variable RTT, to determine HARQ feedback, and in response to the HARQ feedback, encode the PUSCH for a HARQ retransmission using third resources.

Example 31 is a method for a user equipment (UE). The method includes, for a first synchronous HARQ process, selecting first downlink (DL) resources to monitor for first hybrid automatic repeat request (HARQ) feedback based on a first HARQ round trip time (RTT) value, and generating a first HARQ retransmission for first uplink (UL) resources in response to the first HARQ feedback. The method also includes, for a second synchronous HARQ process, selecting second DL resources to monitor for second HARQ feedback based on a second HARQ RTT value, and generating a second HARQ retransmission for second UL resources in response to the second HARQ feedback.

Example 32 includes the method of Example 31, further comprising selecting the first UL resources for the first HARQ retransmission based on the first HARQ RTT value.

Example 33 includes the method of Example 31, wherein a third HARQ RTT value is not equal to the first HARQ value, and wherein the method further comprises selecting the first UL resources for the first HARQ retransmission based on the third HARQ RTT value.

Example 34 includes the method of Example 33, further comprising, for the first synchronous HARQ process, decoding a UL grant for retransmission, the UL grant for retransmission including the third HARQ RTT value.

Example 35 includes the method of Example 31, further comprising: determining the first HARQ RTT value from a first UL grant for a first new transmission corresponding to the first synchronous HARQ process; and determining the second HARQ RTT value from a second UL grant for a second new transmission corresponding to the second synchronous HARQ process.

Example 36 includes the method of Example 35, further comprising decoding a physical downlink control channel (PDCCH) to extract at least one of the first UL grant and the second UL grant.

Example 37 includes the method of Example 35, further comprising encoding at least one of the first new transmission, the first HARQ retransmission, the second new transmission, and the second HARQ retransmission for a physical uplink shared channel (PUSCH).

Example 38 includes the method of Example 31, further comprising: decoding a first dedicated radio resource control (RRC) signal, received from a radio access network (RAN) node, corresponding to the first synchronous HARQ process; extracting the first HARQ RTT value from the first dedicated RRC signal; storing the first HARQ RTT value utilizing the memory interface; decoding a second dedicated RRC signal, received from the RAN node, corresponding to the second synchronous HARQ process; extracting the second HARQ RTT value from the second dedicated RRC signal; and storing the second HARQ RTT value utilizing the memory interface.

Example 39 includes the method of Example 31, further comprising: decoding a first system information broadcast (SIB) signal, received from a radio access network (RAN)

node, corresponding to the first synchronous HARQ process; extracting the first HARQ RTT value from the first SIB signal; storing the first HARQ RTT value utilizing the memory interface; decoding a second SIB signal, received from the RAN node, corresponding to the second synchronous HARQ process; extracting the second HARQ RTT value from the second SIB signal; and storing the second HARQ RTT value utilizing the memory interface.

Example 40 includes the method of Example 31, further comprising: selecting the first HARQ RTT value based on a first type of application associated with the first HARQ synchronous process; and selecting the second HARQ RTT value based on a second type of application associated with the second synchronous HARQ process.

Example 41 includes the method of Example 31, further comprising selecting the first HARQ RTT value and the second HARQ RTT value based on a UE type or class.

Example 42 includes the method of Example 31, further comprising selecting the first HARQ RTT value and the second HARQ RTT value based on a transmission time interval (TTI) used for communication of data traffic.

Example 43 includes the method of Example 31, wherein a new transmission corresponding to the second synchronous HARQ process is allocated at least a portion of the first uplink resources so as to collide with the first HARQ retransmission of the first synchronous HARQ process, and wherein the method further comprises using one or more prioritization rules to determine whether to transmit the new transmission or the first HARQ retransmission using the first uplink resources.

Example 44 includes the method of Example 43, wherein the one or more prioritization rules prioritize new transmissions of higher priority class over HARQ retransmissions of lower priority class, and wherein the one or more prioritization rules prioritize retransmissions within the same class.

Example 45 includes the method of Example 43, wherein the one or more prioritization rules prioritize HARQ retransmissions over the new transmissions regardless of priority class.

Example 46 includes the method of Example 43, wherein the one or more prioritization rules prioritize new transmissions and HARQ retransmissions based on corresponding HARQ process identifier (ID) numbers.

Example 47 is a method for a radio access network (RAN) node, comprising: selecting a value for a variable round trip time (RTT) to use for a particular hybrid automatic repeat request (HARQ) process; generating an indication to communicate, to a user equipment (UE), the selected value for the variable RTT; and performing, in either uplink (UL) or downlink (DL) communication with the UE, the particular HARQ process using the selected value for the variable RTT.

Example 48 includes the method of Example 47, wherein generating the indication comprises encoding the selected value for the variable RTT in an UL grant for a new transmission.

Example 49 includes the method of Example 47, wherein generating the indication comprises encoding the selected value for the variable RTT in a dedicated radio resource control (RRC) signal.

Example 50 includes the method of Example 47, wherein generating the indication comprises selecting a value for the variable RTT in system information broadcast (SIB) signaling.

Example 51 includes the method of Example 47, further comprising selecting the value for the variable RTT based on a transmission time interval (TTI) used during the particular HARQ process.

Example 52 includes the method of Example 47, further comprising selecting the value for the variable RTT based on at least one of a type of application executed by the UE, and a type or class of the UE.

Example 53 includes the method of Example 47, further comprising, for multiple transmission time interval (TTI) coexistence, determining a minimum scheduling interval of transport block size (TBS) for the UE.

Example 54 includes the method of Example 53, wherein the minimum scheduling interval is a shortest of a plurality of TTI durations.

Example 55 includes the method of Example 53, wherein the minimum scheduling interval is a longest of a plurality of TTI durations.

Example 56 includes the method of Example 53, wherein the minimum scheduling interval comprises a shortest of a plurality of TTI durations multiplied by a constant X.

Example 57 includes the method of Example 53, wherein the minimum scheduling interval comprises a longest of a plurality of TTI durations multiplied by a constant X.

Example 58 includes the method of Example 57, wherein a single assignment or grant for a particular TTI applies for X TTIs equivalently forming a multi-TTI assignment or grant.

Example 59 is a method for a user equipment (UE), comprising: decoding a physical downlink control channel (PDCCH) to extract an uplink (UL) grant and a value of a variable round trip time (RTT); and using the value of the variable RTT for a synchronous UL hybrid automatic repeat request (HARQ) process associated with a transmission time interval (TTI) corresponding to the UL grant.

Example 60 includes the method of Example 59, further comprising: encoding a physical uplink shared channel (PUSCH) using first resources indicated by the UL grant for a new transmission; decoding second resources, selected based on the value of the variable RTT, to determine HARQ feedback; and in response to the HARQ feedback, encoding the PUSCH for a HARQ retransmission using third resources.

Example 61 is a computer-readable storage medium having instructions stored thereon that, when executed by a processor of the UE, cause the processor to perform the method of any of Examples 31-60.

Example 62 is an apparatus for the UE, the apparatus comprising means for performing the method of any one of Examples 31-60.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. An apparatus for a user equipment (UE), comprising:
a memory interface to store or access, to or from a memory device, a first hybrid automatic repeat request (HARQ) round trip time (RTT) value and a second HARQ RTT value, wherein the first HARQ RTT value is not equal to the second HARQ RTT value; and
one or more baseband processors to:
for a first synchronous HARQ process, select first downlink (DL) resources to monitor for first HARQ feedback based on the first HARQ RTT value, and generate a first HARQ retransmission for first uplink (UL) resources in response to the first HARQ feedback;
for a second synchronous HARQ process, select second DL resources to monitor for second HARQ feedback based on the second HARQ RTT value, and generate a second HARQ retransmission for second UL resources in response to the second HARQ feedback;
select the first UL resources for the first HARQ retransmission based on the first HARQ RTT value; and
when a new transmission corresponding to the second synchronous HARQ process is allocated at least a portion of the first uplink resources so as to collide with the first HARQ retransmission of the first synchronous HARQ process, use one or more prioritization rules to determine whether to transmit the new transmission or the first HARQ retransmission using the first uplink resources,
wherein the one or more prioritization rules prioritize new transmissions of higher priority class over HARQ retransmissions of lower priority class, and
wherein the one or more prioritization rules prioritize retransmissions within the same class.

2. The apparatus of claim 1, wherein the memory interface is further configured to access or store a third HARQ RTT value, wherein the third HARQ RTT value is not equal to the first HARQ value, and wherein the one or more baseband processors are further configured to select the first UL resources for the first HARQ retransmission based on the third HARQ RTT value.

3. The apparatus of claim 2, wherein the one or more baseband processors are further configured to, for the first synchronous HARQ process, decode a UL grant for retransmission, the UL grant for retransmission including the third HARQ RTT value.

4. The apparatus of claim 1, wherein the one or more baseband processors are further configured to:
determine the first HARQ RTT value from a first UL grant for a first new transmission corresponding to the first synchronous HARQ process; and
determine the second HARQ RTT value from a second UL grant for a second new transmission corresponding to the second synchronous HARQ process.

5. The apparatus of claim 4, wherein the one or more baseband processors are further configured to decode a physical downlink control channel (PDCCH) to extract at least one of the first UL grant and the second UL grant.

6. The apparatus of claim 4, wherein the one or more baseband processors are further configured to encode at least one of the first new transmission, the first HARQ retransmission, the second new transmission, and the second HARQ retransmission for a physical uplink shared channel (PUSCH).

7. The apparatus of claim 1, wherein the one or more processors are further configured to:
decode a first dedicated radio resource control (RRC) signal, received from a radio access network (RAN) node, corresponding to the first synchronous HARQ process;
extract the first HARQ RTT value from the first dedicated RRC signal;
store the first HARQ RTT value utilizing the memory interface;
decode a second dedicated RRC signal, received from the RAN node, corresponding to the second synchronous HARQ process;
extract the second HARQ RTT value from the second dedicated RRC signal; and
store the second HARQ RTT value utilizing the memory interface.

8. The apparatus of claim 1, wherein the one or more processors are further configured to:
decode a first system information broadcast (SIB) signal, received from a radio access network (RAN) node, corresponding to the first synchronous HARQ process;
extract the first HARQ RTT value from the first SIB signal;
store the first HARQ RTT value utilizing the memory interface;
decode a second SIB signal, received from the RAN node, corresponding to the second synchronous HARQ process;
extract the second HARQ RTT value from the second SIB signal; and
store the second HARQ RTT value utilizing the memory interface.

9. The apparatus of claim 1, wherein the one or more baseband processors are further configured to:
select the first HARQ RTT value based on a first type of application associated with the first HARQ synchronous process; and
select the second HARQ RTT value based on a second type of application associated with the second synchronous HARQ process.

10. The apparatus of claim 1, wherein the one or more baseband processors are further configured to select the first HARQ RTT value and the second HARQ RTT value based on a UE type or class.

11. The apparatus of claim 1, wherein the one or more baseband processors are further configured to select the first HARQ RTT value and the second HARQ RTT value based on a transmission time interval (TTI) used for communication of data traffic.

12. The apparatus of claim 1, wherein the one or more prioritization rules prioritize new transmissions and HARQ retransmissions based on corresponding HARQ process identifier (ID) numbers.

* * * * *